United States Patent
Seko et al.

(10) Patent No.: US 11,187,266 B2
(45) Date of Patent: Nov. 30, 2021

(54) DOUBLE-ROW SELF-ALIGNING ROLLER BEARING

(71) Applicant: NTN CORPORATION, Osaka (JP)

(72) Inventors: Kazumasa Seko, Kuwana (JP); Yasuyuki Inoue, Kuwana (JP); Takashi Yamamoto, Kuwana (JP); Michio Hori, Kuwana (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/750,849

(22) Filed: Jan. 23, 2020

(65) Prior Publication Data
US 2020/0158168 A1    May 21, 2020

Related U.S. Application Data

(63) Continuation of application No. PCT/JP2018/027964, filed on Jul. 25, 2018.

(30) Foreign Application Priority Data

Jul. 28, 2017 (JP) .............................. JP2017-146664

(51) Int. Cl.
*F16C 23/08* (2006.01)
*F16C 19/38* (2006.01)

(52) U.S. Cl.
CPC ............ *F16C 23/086* (2013.01); *F16C 19/38* (2013.01)

(58) Field of Classification Search
CPC ........ F16C 19/225; F16C 19/28; F16C 19/38; F16C 23/08; F16C 23/086; F16C 23/088;
(Continued)

(56) References Cited

U.S. PATENT DOCUMENTS 4,557,613 A * 12/1985 Tallian .................. F16C 23/086
384/568
5,433,535 A * 7/1995 Hah ........................ F16C 19/28
384/564
(Continued)

FOREIGN PATENT DOCUMENTS

CN       2721956 Y     8/2005
CN     100489328 C     5/2009
(Continued)

OTHER PUBLICATIONS

English Translation by WIPO of the International Preliminary Report on Patentability dated Feb. 6, 2020, in corresponding to International Patent Application No. PCT/JP2018/027964.
(Continued)

*Primary Examiner* — James Pilkington

(57) ABSTRACT

The double-row self-aligning roller bearing includes an outer ring having a spherical raceway surface, and each of rollers in two rows has an outer peripheral surface whose cross-sectional shape corresponds to the raceway surface of the outer ring. The rollers in the two rows have different lengths from each other, and the length of the longer rollers is equal to or greater than 36% of a bearing width. A ratio of a contact angle of the shorter rollers relative to a contact angle of the longer rollers is within a range of 1:4 to 1:2. The contact angle of the shorter rollers has a range of 3° to 5°, and the contact angle of the longer rollers has a range of 11° to 14°.

4 Claims, 13 Drawing Sheets

(58) Field of Classification Search
CPC ........ F16C 33/36; F16C 33/363; F16C 33/49;
F16C 33/585; F16C 43/06; F16C
2206/04; F16C 2240/34; F16C 2240/40;
F16C 2360/31
See application file for complete search history.

(56) References Cited

U.S. PATENT DOCUMENTS

| | | | |
|---|---|---|---|
| 7,918,649 | B2 | 4/2011 | Nakagawa et al. |
| 8,007,184 | B2 | 8/2011 | Murai et al. |
| 10,385,822 | B2 | 8/2019 | Kullin et al. |
| 10,655,674 | B2* | 5/2020 | Yamamoto ............ F16C 23/086 |
| 2007/0127858 | A1 | 6/2007 | Nakagawa et al. |
| 2008/0260313 | A1 | 10/2008 | Murai et al. |
| 2009/0110340 | A1 | 4/2009 | Ito |
| 2013/0343689 | A1* | 12/2013 | Kobayashi ............ F16C 33/62 384/569 |
| 2014/0112607 | A1 | 4/2014 | Silverio et al. |
| 2016/0090966 | A1 | 3/2016 | Kullin et al. |

FOREIGN PATENT DOCUMENTS

| | | |
|---|---|---|
| CN | 105464897 A | 4/2016 |
| CN | 105822661 A | 8/2016 |
| DE | 10 2004 047 881 | 4/2006 |
| DE | 10 2015 204 970 A1 | 9/2016 |
| EP | 2 087 248 B1 | 1/2010 |
| EP | 1 705 392 B2 | 8/2016 |
| JP | 2004-245251 | 9/2004 |
| JP | 2007-205535 | 8/2007 |
| JP | 2011-153670 | 8/2011 |
| JP | 2012-57722 | 3/2012 |
| JP | 2013-96448 | 5/2013 |
| JP | 2013-228010 | 11/2013 |
| WO | WO 2005/050038 | 6/2005 |
| WO | WO 2016/146115 | 9/2016 |

OTHER PUBLICATIONS

International search report dated Oct. 23, 2018, in corresponding International Patent Application No. PCT/JP2018/027964.
Extended European Search Report dated Mar. 16, 2021, in European Patent Application No. 18838014.1, 10 pages.
Chinese Office Action dated Nov. 2, 2020, in corresponding Chinese Patent Application No. 201880049460.X.
Japanese Office Action dated Mar. 30, 2021, in Japanese Patent Application No. 2017-146664 (9 pages including translation).
Notification to Grant Right for Invention dated Jun. 2, 2021, issued in Chinese Patent Application No. 201880049460.X (5 pages including translation).

* cited by examiner

COMPARISON OF SURFACE PRESSURE DISTRIBUTIONS IN FRONT ROWS

COMPARISON OF SURFACE PRESSURE DISTRIBUTIONS IN REAR ROWS

DOUBLE-ROW SELF-ALIGNING ROLLER BEARING

CROSS REFERENCE TO THE RELATED APPLICATION

This application is a continuation application, under 35 U.S.C. § 111(a), of international application No. PCT/JP2018/027964, filed Jul. 25, 2018, which claims priority to Japanese patent application No. 2017-146664, filed Jul. 28, 2017, the entire disclosures of all of which are herein incorporated by reference as a part of this application.

BACKGROUND OF THE INVENTION

Field of the Invention

The present invention relates to a double-row self-aligning roller bearing to be applied to a use in which unequal loads are applied to rollers in two rows arranged in a bearing width direction, for example, to a bearing for supporting a main shaft of a wind turbine generator, industrial machinery or the like.

Description of Related Art

On a bearing that supports a main shaft of a wind turbine generator, an axial load due to wind force acts in addition to a radial load due to weights of blades and a rotor head. In the case where the bearing for supporting the main shaft is a double-row self-aligning roller bearing 41 as shown in FIG. 18, among rollers 44, 45 in two rows interposed between an inner ring 42 and an outer ring 43, only the rollers 45 in one row that is situated on the rear side with respect to an axial load Fa mainly receive the axial load Fa. In other words, the rollers 45 in one row receive both radial load and axial load, while the rollers 44 in the other row receive substantially only the radial load. For this reason, the rollers 45 in the row that receives the axial load have higher contact surface pressures than those of the rollers 44 in the row that receives only the radial load, and thus the rolling surface of the rollers 45 and the raceway surface 43$a$ of the outer ring 43 are more susceptible to surface damage or wear, resulting in shorter rolling fatigue life of the rollers. Therefore, the substantial service life of the entire bearing is limited by the rolling life of the rollers 45 in the row that receives the axial load.

In order to solve this problem, it has been proposed, as in a double-row self-aligning roller bearing 51 shown in FIG. 19, to make lengths L1, L2 of rollers 54, 55 in two rows interposed between an inner ring 52 and an outer ring 53 different from each other so as to make a load capacity of the rollers 55 in the row that receives an axial load larger than a load capacity of the rollers 54 in the row that hardly receives the axial load (Patent Document 1). By setting the roller lengths L1, L2 such that appropriate load capacities can be obtained for the rollers 54, 55 in the respective rows, it is possible to achieve substantially the same rolling life for the rollers 54, 55 in the respective rows and thereby to increase the substantial service life of the entire bearing.

Additionally, it has been proposed, as in a double-row self-aligning roller bearing 61 shown in FIG. 20, to make contact angles θ1, θ2 of rollers 64, 65 in two rows interposed between an inner ring 62 and an outer ring 63 different from each other so as to be able to receive a larger axial load with the rollers 65 having the larger contact angle θ2 (Patent Document 2). By setting the contact angles θ1, θ2 such that appropriate load capacities can be obtained for the rollers 64, 65 in the respective rows, it is possible to achieve substantially the same rolling life for the rollers 64, 65 in the respective rows and thereby to increase the substantial service life of the entire bearing.

Related Document

Patent Document

[Patent Document 1] WO 2005/050038
[Patent Document 2] U.S. Patent Application Publication No. 2014/0112607

SUMMARY OF THE INVENTION

As stated above, by making the lengths L1, L2 of the rollers 54, 55 in two rows different from each other as in FIG. 19 or by making the contact angles θ1, θ2 of the rollers 64, 65 in two rows different from each other as in FIG. 20, it is possible to increase the load capacities of the rollers 55, 65 in the rows that receive the axial loads and thereby to increase the substantial service life of the entire bearing. However, due to a restriction of dimensional standards for bearings (ISO Standard; JIS B 1512), it is difficult to increase the load capacities of the rollers 55, 65 in the rows that receive the axial loads to appropriate values by using only one of the two techniques. In other words, since the dimensional standards specify an inner diameter, an outer diameter and a bearing width for each nominal number, if the length L2 of the rollers 55 in the row that receives the axial load in FIG. 19 is made too long, the bearing width B exceeds a standard value. Similarly, if the contact angle θ2 of the rollers 65 in the row that receives the axial load in FIG. 20 is made too large, the inner diameter d exceeds a standard value.

In view of the foregoing, it was attempted to combine the technique of making the lengths of the rollers in two rows different from each other and the technique of making the contact angles of the rollers in two rows different from each other in order to equalize the contact surface pressures of the row that receives the axial load and of the row that receives the radial load only, without making the dimensions of respective parts out of the dimensional standards of bearings. In this case, it is important to set the contact angle of the rollers in the row that receives the axial load to be larger so as to obtain a sufficiently large load capacity for the rollers. For this purpose, it is necessary to find out an appropriate ratio of the contact angles of the rollers in the respective rows as well as ranges of the contact angles of the rollers in respective rows within the standards.

An object of the present invention is to provide a double-row self-aligning roller bearing which is suitable for a use in which the bearing receives an axial load and a radial load, and loads having mutually different magnitudes act on rollers in two rows arranged in an axial direction, and which can achieve a sufficiently large load capacity for the rollers in the row that receives the axial load, by appropriately specifying a ratio of contact angles of the rollers in the two rows and ranges of the contact angles of the rollers in the two rows within the constraint of the dimensional standards.

A double-row self-aligning roller bearing according to the present invention includes: an inner ring; an outer ring having a spherical raceway surface; and rollers in two rows arranged in a bearing width direction, the rollers being interposed between the inner ring and the outer ring, the rollers in two rows each having an outer peripheral surface whose cross-sectional shape corresponds to the raceway surface of the outer ring, wherein each roller in one row of the two rows has a length different from that of each roller in the other row of the two rows, the length of the longer rollers is equal to or greater than 36% of a bearing width, a ratio of a contact angle of the shorter rollers relative to a contact angle of the longer rollers is within a range of 1:4 to 1:2, and the contact angle of the shorter rollers has a range of 3° to 5°, and the contact angle of the longer rollers has a range of 11° to 14°.

According to this configuration, by making the length of the rollers in one row of the two rows different from that of the rollers in the other row, the longer rollers have a larger load capacity than that of the shorter rollers. Moreover, by making the contact angle of the longer rollers larger than the contact angle of the shorter rollers, the longer rollers are capable of enduring a large axial load. By making the contact angle of the longer rollers larger than the contact angle of the shorter rollers, the contact angle of the shorter rollers is in turn made small, resulting in an increased load capacity of the shorter rollers for the radial load.

When the double-row self-aligning roller bearing is used under a condition where an axial load and a radial load act, the longer rollers having the larger contact angle bear substantially all the axial load and part of the radial load, and the shorter rollers having the smaller contact angle bear the rest of the radial load. By sharing the axial load and the radial load between the rollers in two rows in such a share proportion, the contact surface pressures on the rollers in respective rows can be equalized. Thus, it is possible to secure a large load capacity of the entire bearing as well as to increase the substantial service life of the entire bearing.

A plurality of double-row self-aligning roller bearings of width series 3 having different ratios of contact angles of rollers in respective rows were prepared, and each double-row self-aligning roller bearing was analyzed for contact surface pressures on the rollers in respective rows under an axial load and a radial load assumed when the bearing is used for supporting a main shaft of a wind turbine generator. As a result, it was found that the contact surface pressures on the rollers in respective rows are most equalized at the ratio of the contact angles of 1:3.5.

The assumed axial load and radial load refer to an axial load and a radial load when an average wind turbine generator in view of conditions such as its power generation capacity and installation location is most normally operated. Therefore, it is conceivable that an optimum ratio of contact angles may not be 1:3.5 in a double-row self-aligning roller bearing used in a wind turbine generator that is different from such an average wind turbine generator in these conditions. However, even in that case, the optimum ratio of the contact angles falls within a range of 1:4 to 1:2. Accordingly, it is desirable to set the ratio of the contact angles of the rollers in respective rows to be within a range of 1:4 to 1:2. It should be noted that if the ratio of the contact angles is smaller than 1:4, it becomes difficult to dispose longer rollers having a larger contact angle because the thickness of the inner ring is made too thin due to the dimensional constraint.

With respect to this, it was found that a double-row self-aligning roller bearing that falls within the dimensional standards and has a ratio of the contact angles of the rollers in the two rows within the above appropriate range can be obtained by adding conditions that the length of the longer rollers is equal to or greater than 36% of the bearing width and that the contact angle of the shorter rollers has a range of 3° to 5°, and the contact angle of the longer rollers has a range of 11 to 14°.

The bearing may include retainers configured to retain the rollers of the respective rows, wherein each retainer includes an annular portion configured to guide axially inner end faces of the rollers of each row; and a plurality of pillar portions extending in an axial direction from the annular portion and provided at predetermined intervals along a circumferential direction, the pillar portions defining therebetween pockets configured to retain the rollers, and wherein the pillar portions of one of the retainers which is configured to retain the longer rollers have an outer diameter surface inclined by an inclination angle inwardly in a radial direction from a proximal end side to a distal end side.

The predetermined intervals are any interval defined depending on designs or the like and may, for example, be defined by calculating an appropriate interval by performing one or both of a test or a simulation.

According to this configuration, as the pillar portions of one of the retainers which is configured to retain the longer rollers have the outer diameter surface inclined by an inclination angle inwardly in the radial direction from the proximal end side to the distal end side, pocket surfaces of the retainer can hold the rollers at maximum diameter positions thereof. Thus, it is possible to secure attitude stability of the longer rollers and to easily incorporate the longer rollers into the bearing.

Each of the rollers may have a roller rolling surface coated with a DLC coating and formed with a crowning on each end portion of the roller rolling surface.

The term "DLC" is an abbreviation for Diamond-like Carbon.

According to this configuration, as each of the rollers has the roller rolling surface coated with a DLC coating, wear resistance can be enhanced. Thus, less wear occurs on the roller rolling surface and on the raceway surfaces of the inner ring and the outer ring, compared with rollers without the DLC coating. Further, as the roller rolling surface is formed with a crowning on each end portion, edge stress can be relaxed.

The inner ring may include an intermediate flange provided between the two rows of the rollers on the outer peripheral surface of the inner ring and configured to guide the rollers in the two rows; and small flanges provided on opposite ends of the outer peripheral surface and facing axially outer end faces of the rollers of the respective rows, and the inner ring may have an insertion groove configured to insert therethrough the longer rollers into the bearing, on one of the small flanges that faces the axially outer end faces of the longer rollers. In such a case, as the inner ring has an insertion groove configured to insert therethrough the longer rollers into the bearing, on one of the small flanges which faces the axially outer end faces of the longer rollers, incorporation of the longer rollers can be made significantly easier.

The present invention encompasses any combination of at least two features disclosed in the claims and/or the specification and/or the drawings. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views. In the figures.

DESCRIPTION OF THE EMBODIMENTS

A double-row self-aligning roller bearing according to one embodiment of the present invention will be described with reference to FIG. 1 to FIG. 12.

Figure 1:
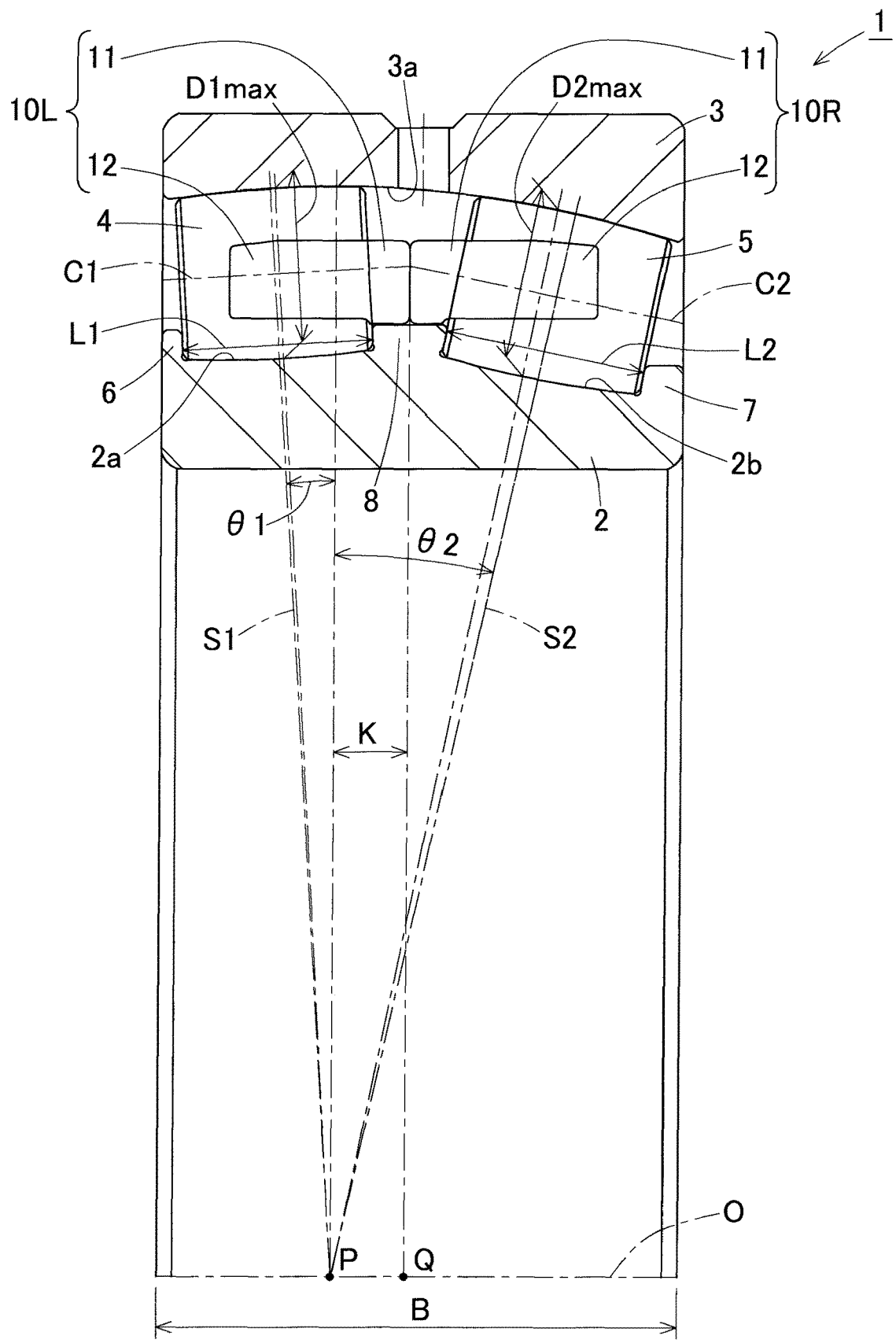
FIG. 1 is a section view of a double-row self-aligning roller bearing according to an embodiment of the present invention.

As shown in FIG. 1, the double-row self-aligning roller bearing 1 includes an inner ring 2, an outer ring 3 and rollers in two left and right rows arranged in a bearing width direction, the roller being interposed between the inner ring 2 and the outer ring 3. The outer ring 3 has a spherical raceway surface 3a. Each of the rollers 4, 5 in the left and right rows has an outer peripheral surface whose cross-sectional shape corresponds to the raceway surface 3a of the outer ring 3. In other words, the outer peripheral surfaces of the rollers 4, 5 are rotation curved surfaces obtained by rotating respective circular arcs corresponding to the raceway surface 3a of the outer ring 3 about center lines C1, C2. The inner ring 2 is formed with raceway surfaces 2a, 2b in double rows, whose cross-sectional shapes correspond to the outer peripheral surfaces of the rollers 4, 5 in the respective left and right rows. The outer peripheral surface of the inner ring 2 has opposite ends provided with flanges (small flanges) 6, 7. The outer peripheral surface of the inner ring 2 has a center portion, that is, a portion between the rollers 4 in the left row and the rollers 5 in the right row, provided with an intermediate flange 8. It should be noted that the words "left" and "right" used herein merely indicate a relative positional relationship in an axial direction of the bearing for the sake of convenience. In this description, the words "left" and "right" correspond to the left and right, respectively, throughout the drawings for ease of understanding.

Figure 2:
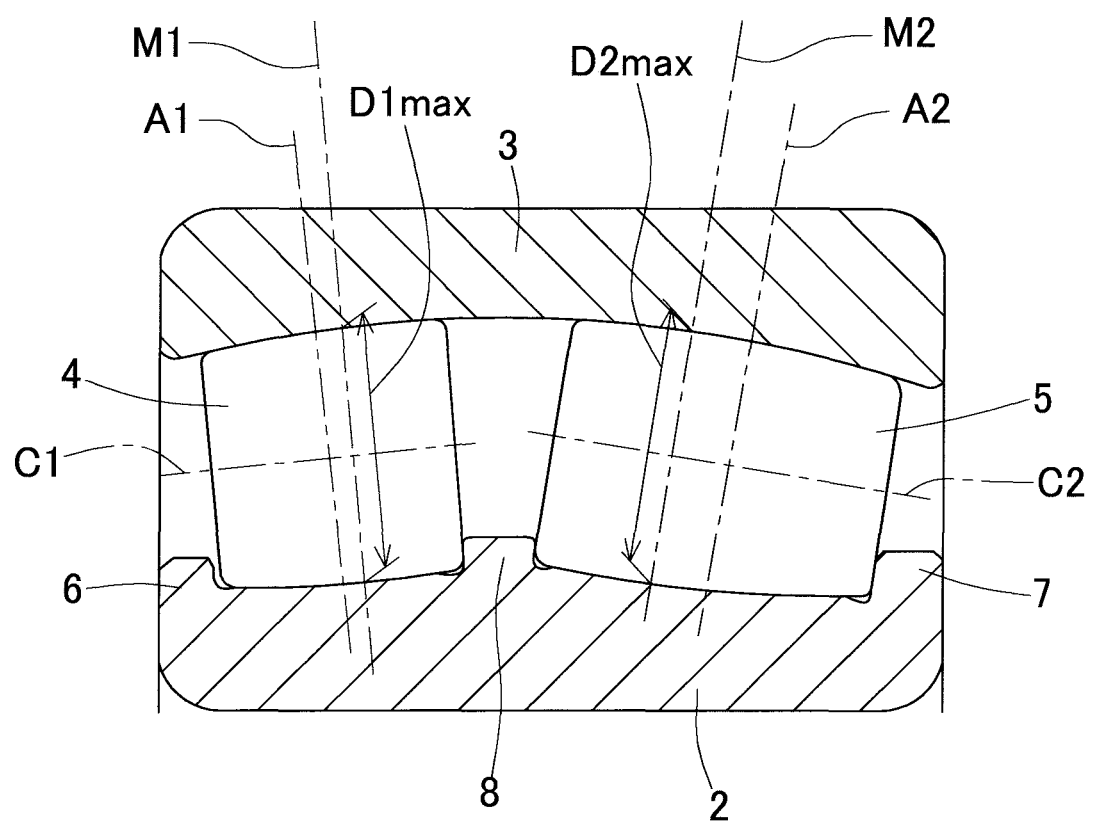
FIG. 2 illustrates asymmetrical rollers.

As exaggeratedly shown in FIG. 2, the rollers 4, 5 in the respective left and right rows are asymmetrical rollers having respective maximum diameters $D1_{max}$, $D2_{max}$ at positions M1, M2 displaced from centers A1, A2 of the roller lengths thereof. The position M1 of the maximum diameter $D1_{max}$ of the rollers 4 in the left row is on the right side of the center A1 of the roller length, and the position M2 of the maximum diameter $D2_{max}$ of the rollers 5 in the right row is on the left side of the center A2 of the roller length. Induced thrust loads are generated to the rollers 4, 5 in the left and right rows, which are in the form of such asymmetrical rollers. The intermediate flange 8 of the inner ring 2 is provided for receiving the induced thrust loads. A combination of the asymmetrical rollers 4, 5 and the intermediate flange 8 allows the rollers 4, 5 to be guided accurately because the rollers 4, 5 are guided at three locations, i.e. the inner ring 2, the outer ring 3 and the intermediate flange 8.

As shown in FIG. 1, the rollers 4 in the left row and the rollers 5 in the right row have the same maximum diameters $D1_{max}$, $D2_{max}$ and different lengths L1, L2 along the center lines C1, C2 from each other. The length L2 of the longer rollers (i.e., rollers in the right row in FIG. 1) 5 is equal to or greater than 36% of the bearing width B.

The longer rollers 5 have a contact angle θ2 that is larger than a contact angle θ1 of the short rollers 4. A ratio of the contact angle θ1 of the short rollers 4 relative to the contact angle θ2 of the longer rollers 5 is set within the range of 1:4 to 1:2. The most preferable ratio of the contact angles θ1, θ2 is 1:3 for a double-row self-aligning roller bearing of width series 4 and 1:3.5 for a double-row self-aligning roller bearing of width series 3, the reason of which will be explained later. Specifically, the contact angle θ1 has a range of, for example, 3° to 5°, and the contact angle θ2 has a range of, for example, 11° to 14°.

The position of a point P in the bearing width direction at which lines of action S1, S2 which define the contact angles θ1, θ2 of the respective rows intersect is displaced by a distance K toward a side of the short rollers 4 from a center position Q of the intermediate flange 8 in the bearing width direction. This makes it possible to increase the contact angle θ2 of the longer rollers 5 without making the longer rollers 5 unnecessarily long. It should be noted that the lines of action S1, S2 are defined as lines along which a synthetic force of forces acting on contact portions between the rollers 4, 5 and the inner and outer rings 2, 3 acts. The point P at which the lines of action S1, S2 intersect is located on a bearing center axis O.

The rollers 4, 5 in the left and right rows are retained by retainers 10L, 10R, respectively. The retainer 10L for the left row includes an annular portion 11 and a plurality of pillar portions 12 extending from the annular portion 11 toward the left side, and the rollers 4 in the left row are retained in pockets between the respective pillar portions 12. The retainer 10R for the right row includes an annular portion 11 and a plurality of pillar portions 12 extending from the annular portion 11 toward the right side, and the rollers 5 in the right row are retained in pockets between the respective pillar portions 12.

The double-row self-aligning roller bearing 1 of this configuration is used in a use in which the bearing receives an axial load and a radial load, and loads having mutually different magnitudes act on rollers in left and right rows, for example, a bearing for supporting a main shaft of a wind turbine generator. In that case, the double-row self-aligning roller bearing 1 is installed such that the rollers 4 in the left row are located on a side close to rotor blades (the front side) and that the rollers 5 in the right row are located on a side away from the rotor blades (the rear side). In this way, the rollers 5 in the right row having the longer length L2 and the larger contact angle θ2 bear substantially all the axial load and part of the radial load, and the rollers 4 in the left row having the shorter length L1 and a smaller contact angle θ1 bear the rest of the radial load.

By properly setting the lengths L1, L2 and the contact angles θ1, θ2 of the rollers 4, 5, loads can be shared in a proportion according to the load capacities of the rollers 4, 5 in the left and right rows. As a result, the surface pressures of the rollers 4, 5 in the left and right rows are equalized. Thus, it is possible to secure a large load capacity of the entire bearing as well as to increase the substantial service life of the entire bearing.

Figure 3:
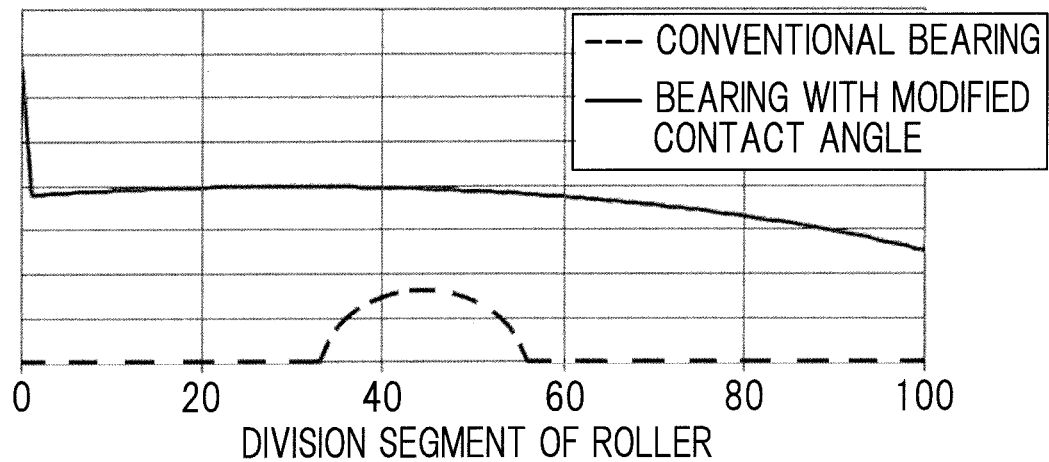
FIG. 3 is a graph showing a result of the analysis for contact surface pressure distribution on rollers on front sides when a synthetic load of an axial load and a radial load is applied to the double-row self-aligning roller bearing and to a conventional double-row self-aligning roller bearing.
Figure 18:
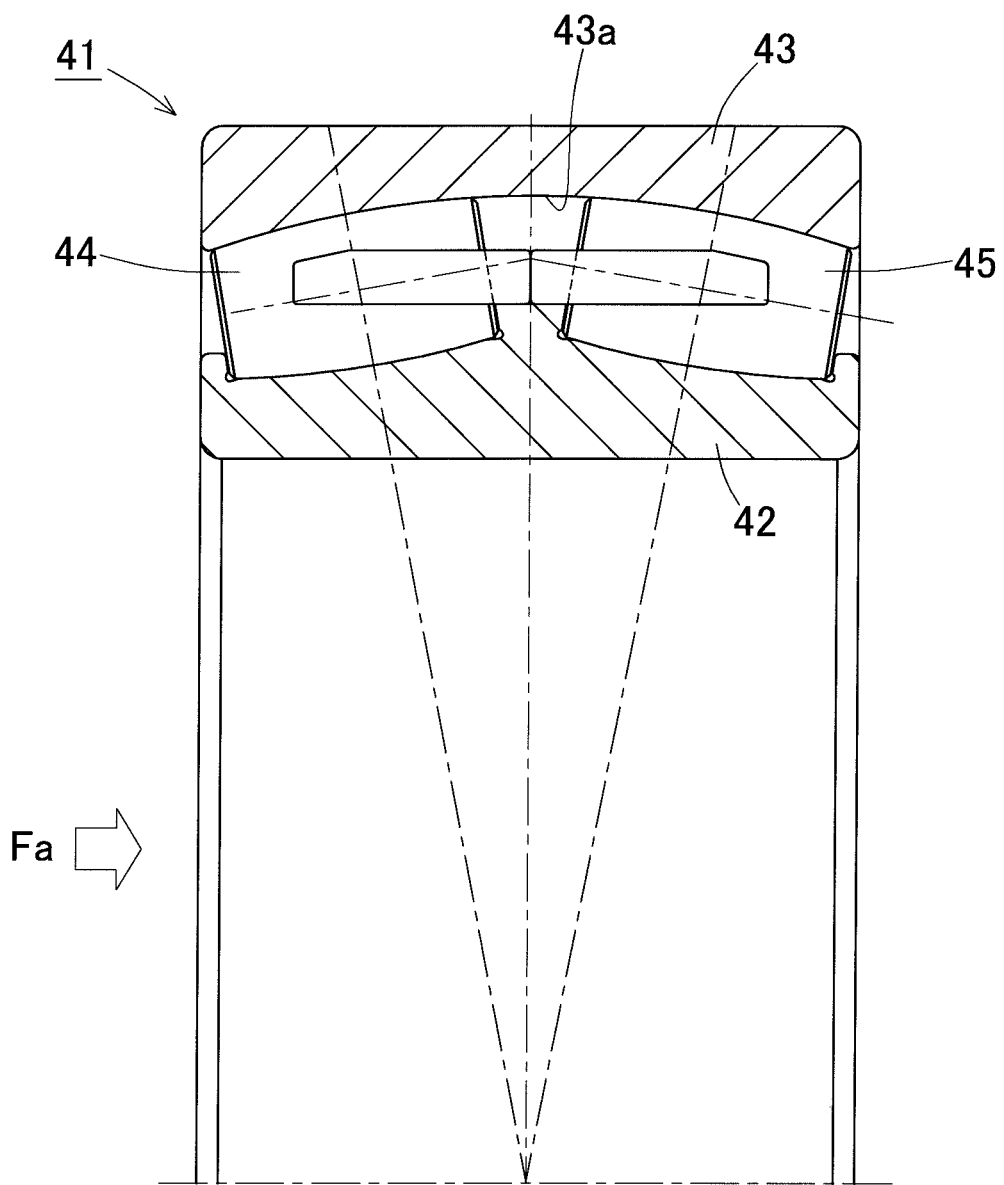
FIG. 18 is a section view of a conventional common double-row self-aligning roller bearing.
Figure 19:
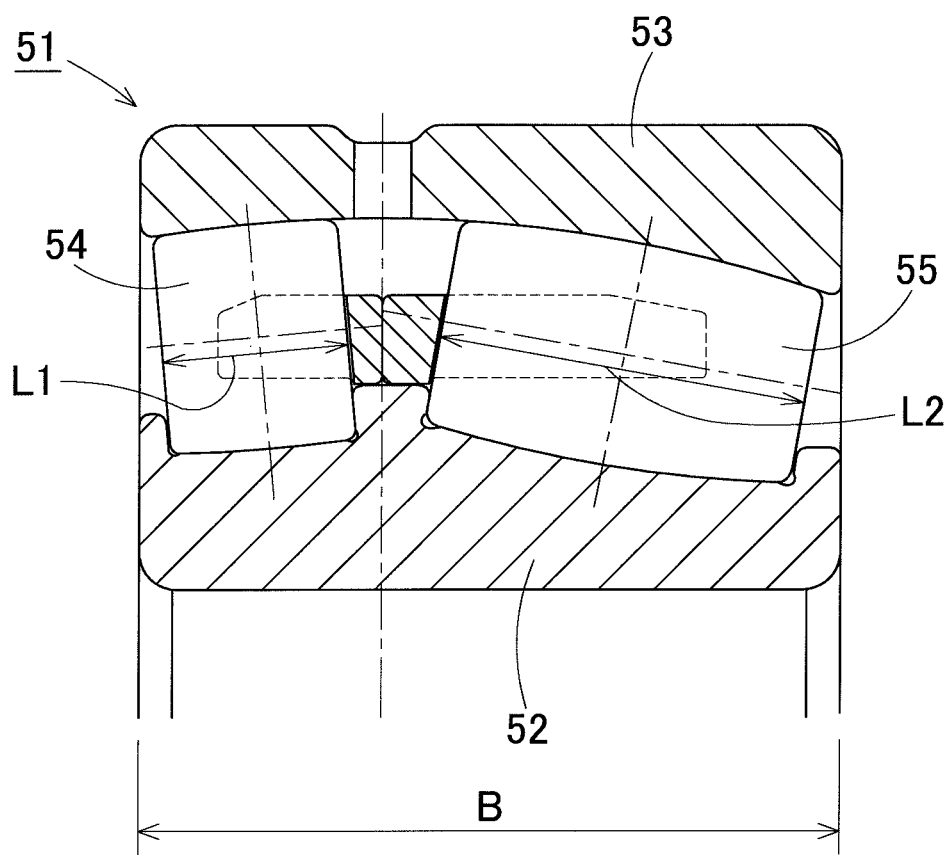
FIG. 19 is a section view of a double-row self-aligning roller bearing according to a first proposed example.
Figure 20:
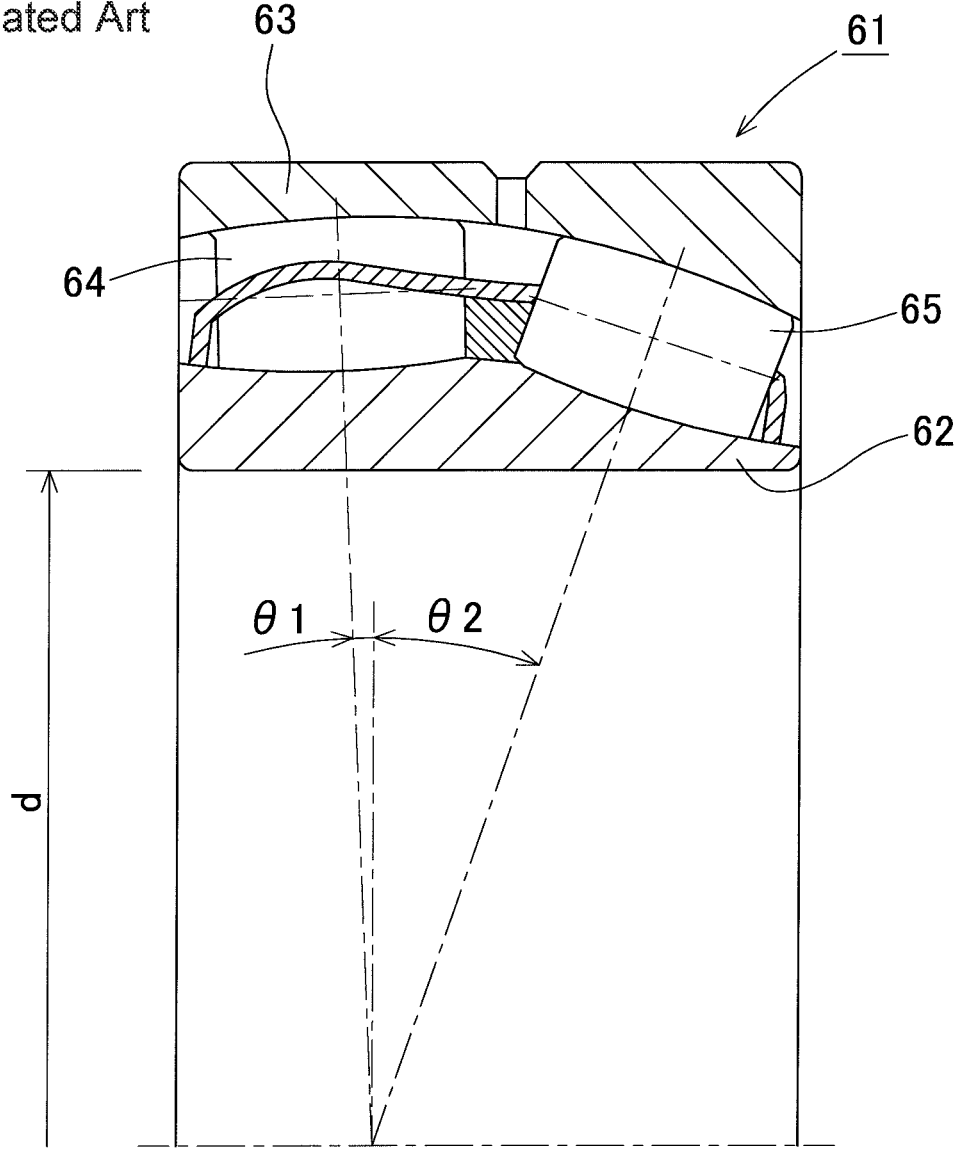
FIG. 20 is a section view of a double-row self-aligning roller bearing according to a second proposed example.

For a conventional double-row self-aligning roller bearing 41 shown in FIG. 18 and the double-row self-aligning roller bearing 1 according to the present embodiment (with modified contact angles) shown in FIG. 1, contact surface pressures of the rollers in the left and right rows were analyzed under a synthetic load of an axial load and a radial load assumed when each bearing is used for supporting a main shaft of a wind turbine generator. In this analysis, comparisons were made between bearings of width series 4 representing a conventional bearing and a bearing according to the present embodiment as well as between bearings of width series 3 representing a conventional bearing and a bearing according to the present embodiment. FIG. 3 shows contact surface pressure distributions on the front sides, i.e. on the rollers 44, 4 in the left rows, and FIG. 4 shows the analytical result of contact surface pressure distributions on the rear sides, i.e. on the rollers 45, 5 in the right rows.

Figure 4:
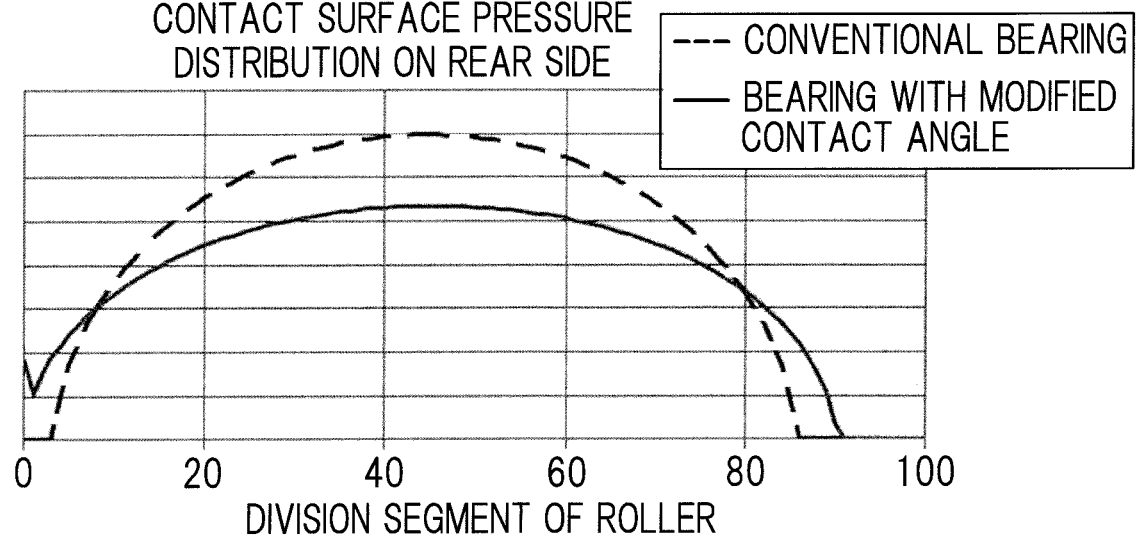
FIG. 4 is a graph showing a result of the analysis for contact surface pressure distribution on rollers on rear sides when a synthetic load of an axial load and a radial load is applied to the double-row self-aligning roller bearing and to a conventional double-row self-aligning roller bearing.

From FIG. 3 and FIG. 4, the following is revealed. The conventional bearing in FIG. 18 has lower contact surface pressures on the front side and higher contact surface pressures on the rear side, and thus loads are unequally shared between the front side and the rear side. In contrast, the bearing with modified contact angles in FIG. 1 has equalized contact surface pressures with reduced difference between contact surface pressures in respective rows because the contact surface pressures are distributed over the entirety of the rollers on the front side, reducing a maximum value of the contact surface pressures on the rear side.

Figure 5:
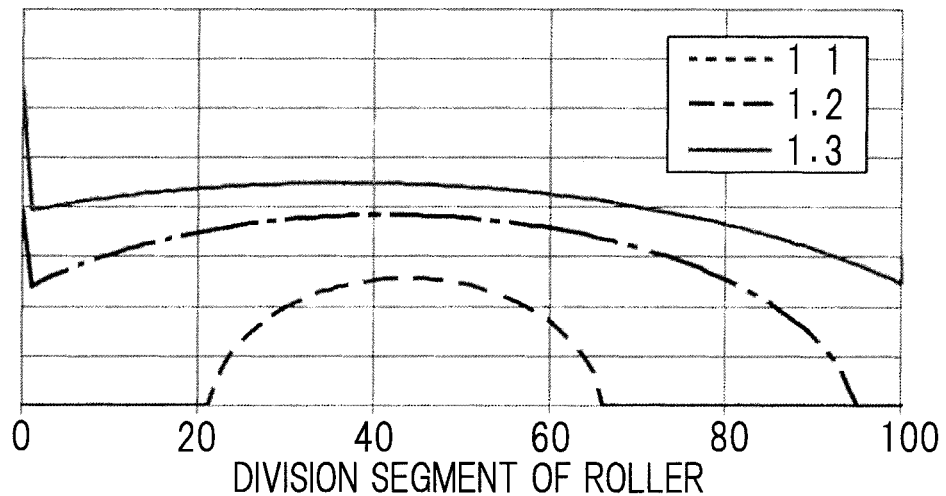
FIG. 5 is a graph showing a result of the analysis for contact surface pressure distribution on rollers on front sides when a synthetic load of an axial load and a radial load is applied to plural types of double-row self-aligning roller bearings having different ratios of contact angles of rollers in two rows.
Figure 6:
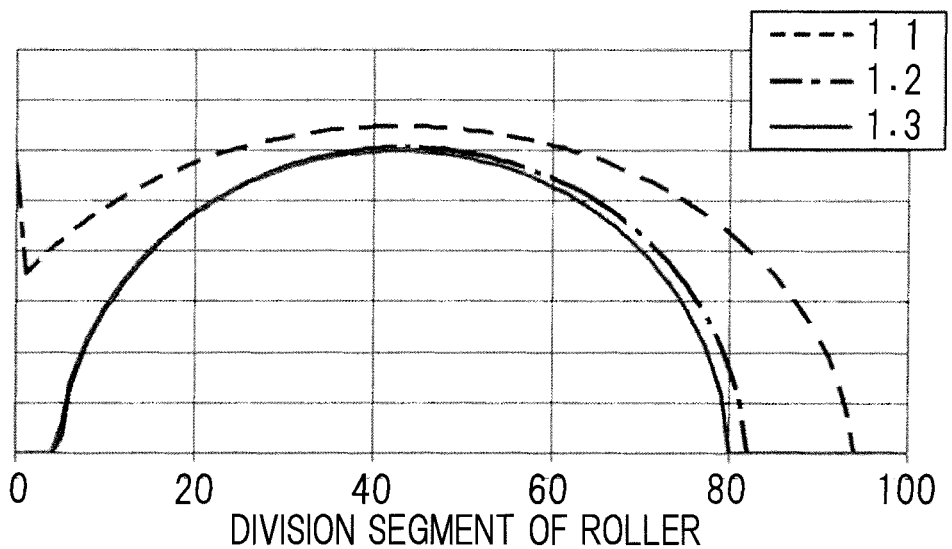
FIG. 6 is a graph showing a result of the analysis for contact surface pressure distribution on rollers on rear sides when a synthetic load of an axial load and a radial load is applied to plural types of double-row self-aligning roller bearings having different ratios of contact angles of rollers in two rows.

Three types of double-row self-aligning roller bearings each having a different ratio of the contact angle θ1 of the rollers 4 in the left row and the contact angle θ2 of the rollers 5 in the right row were prepared, and contact surface pressures on the rollers in the left and right rows were analyzed in the same way. FIG. 5 shows the analytical result of contact surface pressure distributions on the front sides, i.e. on the rollers 4 in the left rows, in the double-row self-aligning roller bearings of width series 4, and FIG. 6 shows the analytical result of contact surface pressure distributions on the rear sides, i.e. on the rollers 5 in the right rows, in the double-row self-aligning roller bearings of width series 4. The bearing having the ratio of the contact angles of 1:1 is a conventional one, and the bearings having the ratios of the contact angles of 1:2, 1:3 are those of the present invention having modified contact angles.

From FIG. 5 and FIG. 6, the following is revealed. When the contact surface pressure distributions are compared for the respective ratios of the contact angles, the bearing having the ratio of the contact angles of 1:3 has most equalized contact surface pressures between the front side and the rear side. The bearing having the ratio of the contact angles of 1:2 is less equalized when compared with the bearing having the ratio of the contact angles of 1:3 but is sufficiently equalized when compared with the bearing having the ratio of the contact angles of 1:1.

Figure 7:
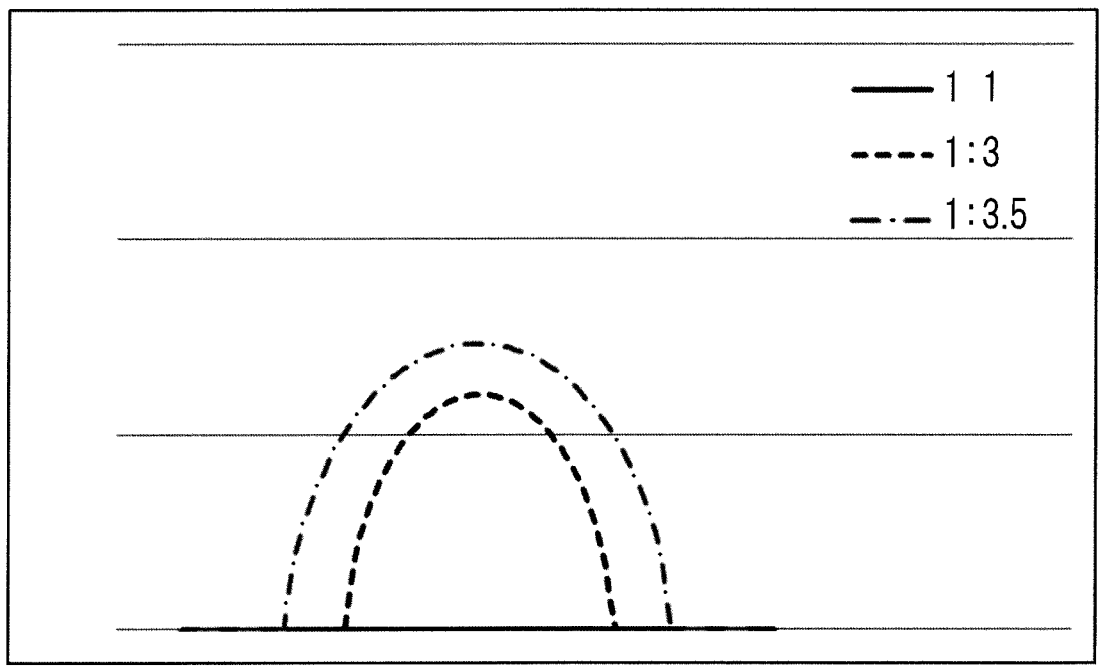
FIG. 7 is a graph showing a result of the analysis for contact surface pressure distribution on rollers on front sides when a synthetic load of an axial load and a radial load is applied to double-row self-aligning roller bearings of width series 3.
Figure 8:
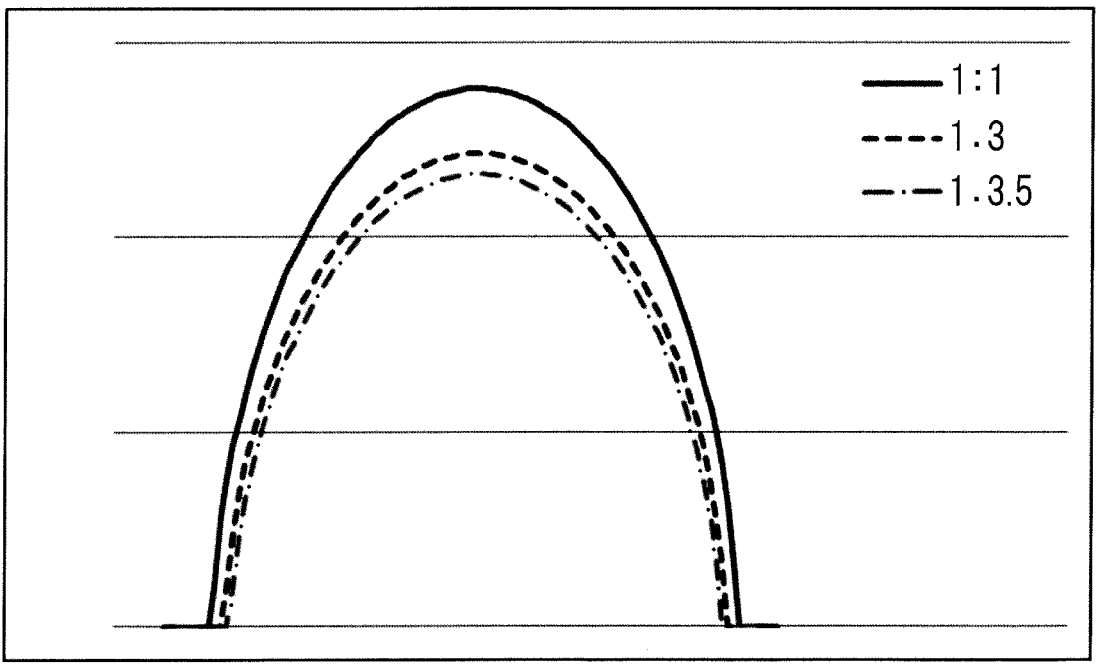
FIG. 8 is a graph showing a result of the analysis for contact surface pressure distribution on rollers on rear sides when a synthetic load of an axial load and a radial load is applied to double-row self-aligning roller bearings of width series 3.

As shown in FIG. 7, FIG. 8, when the contact surface pressure distributions are also compared for the respective ratios of the contact angles among the double-row self-aligning roller bearings of width series 3, the bearing having the ratio of the contact angles of 1:3.5 has most equalized contact surface pressures between the front side and the rear side. The bearing having the ratio of the contact angles of 1:3 is less equalized when compared with the bearing having the ratio of the contact angles of 1:3.5 but is sufficiently equalized when compared with the bearing having the ratio of the contact angles of 1:1. As can be seem from FIG. 1, when the contact angle θ2 of the rollers 5 is made larger, it becomes difficult to dispose the longer rollers 5 because the thickness of the inner ring 2 is made too thin due to the dimensional constraint. In view of these, it is desirable to set the ratio of the contact angles to be equal to or greater than 1:4 and equal to or less than 1:2.

It should be noted that the assumed axial load and radial load refer to an axial load and a radial load when an average wind turbine generator in view of conditions such as its power generation capacity and installation location is most normally operated. Therefore, it is conceivable that an optimum ratio of contact angles may not be 1:3 in a double-row self-aligning roller bearing of width series 4 or may not be 1:3.5 in a double-row self-aligning roller bearing of width series 3, in the case where the double-row self-aligning roller bearing is used in a wind turbine generator that is different from such an average wind turbine generator in these conditions. However, even in such a case, the optimum ratio of the contact angles falls within a range of 1:4 to 1:2.

Figure 9:
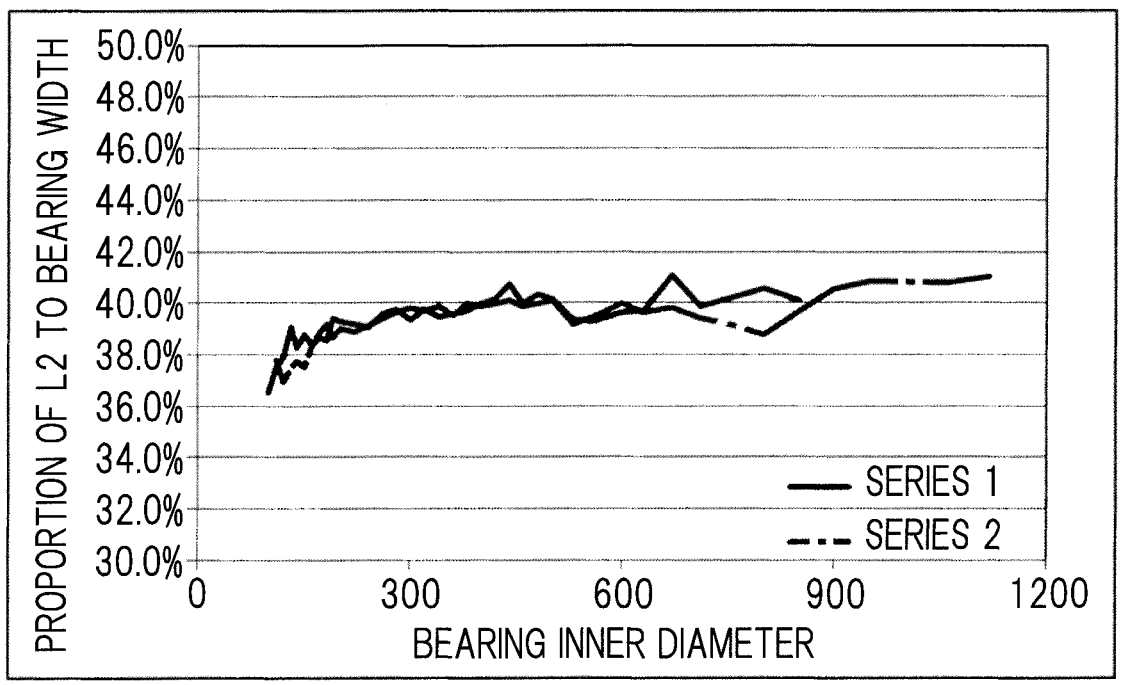
FIG. 9 shows ratios of roller lengths of longer rollers to bearing widths for plural types of double-row self-aligning roller bearings in the same graph.

Moreover, a double-row self-aligning roller bearing that falls within the dimensional standards and has a ratio of the contact angles of the rollers of respective rows within the above appropriate range can be obtained by adding conditions that the length L2 of the longer rollers 5 is equal to or greater than 36% of the bearing width B and that the contact angle θ1 of the shorter rollers 4 has a range of 3° to 5°, and the contact angle θ2 of the longer rollers 5 has a range of 11° to 14°, in a double-row self-aligning roller bearing of width series 3. Also, of the dimensional standards, the proportion of the length L2 of the rollers 5 relative to the bearing width B was examined for multiple double-row self-aligning roller bearings (denoted as series 1 and 2) of width series 3. As a result, as shown in FIG. 9, the proportion was found to be 36% or higher. The dimensional standards specify an inner diameter, an outer diameter and a bearing width.

Figure 10:
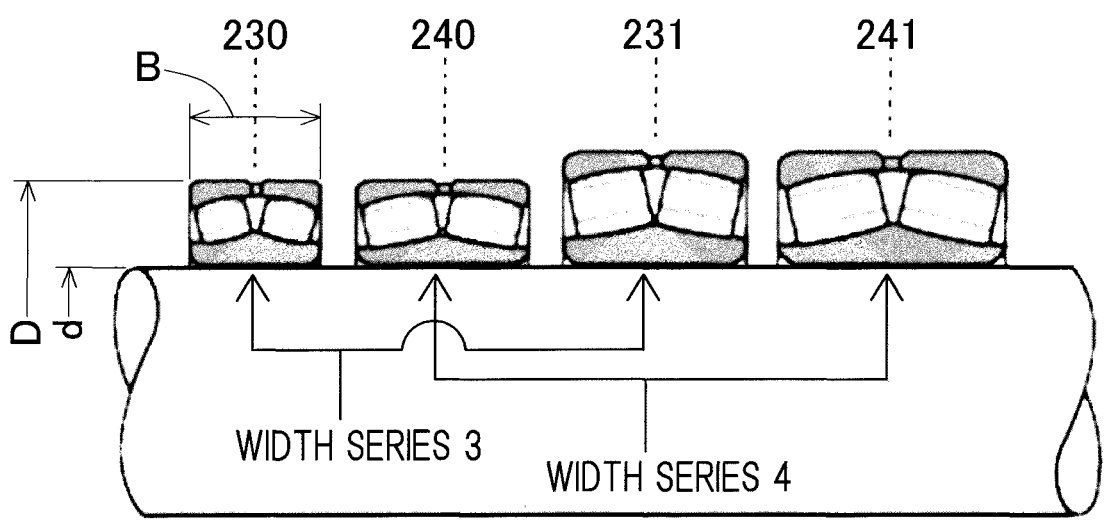
FIG. 10 illustrates double-row self-aligning roller bearings of width series 3 and width series 4.

FIG. 10 illustrates double-row self-aligning roller bearings of width series 3 and width series 4.

The width series of bearings are specified by the dimensional standards for bearings (ISO Standard; JIS B 1512). For width dimensions of bearings (bearing width B), there are different model numbers of the width series in accordance with inner diameter dimensions, each having different width dimensions.

An approximate value of a width dimension B can be obtained by using the following formula from an inner diameter d, an outer diameter D and a coefficient $f_b$ of a bearing.

$B = f_b(D-d)/2$

TABLE 1

| | Width series | | | | | | | |
|---|---|---|---|---|---|---|---|---|
| | 0 | 1 | 2 | 3 | 4 | 5 | 6 | 7 |
| $f_b$ | 0.64 | 0.88 | 1.15 | 1.5 | 2 | 2.7 | 3.6 | 4.8 |

From the formula, the width dimension of a bearing of width series 3 is equal to 75% (=1.5/2) of that of a bearing of width series 4. A smaller width dimension results in different numerical limitation ranges for a contact angle and a roller length.

As shown in FIG. 1, in the double-row self-aligning roller bearing having the ratio of the contact angles θ1, θ2 of the rollers 4, 5 of the respective rows within the above appropriate range, the investigation of the ratio (L1/L2) of the length L1 of the shorter rollers 4 to the length L2 of the longer rollers 5 revealed that the ratio is in a range from 0.91 to 0.96 in the double-row self-aligning roller bearing of width series 3 and is in a range from 0.87 to 0.92 in the double-row self-aligning roller bearing of width series 4.

Figure 11:
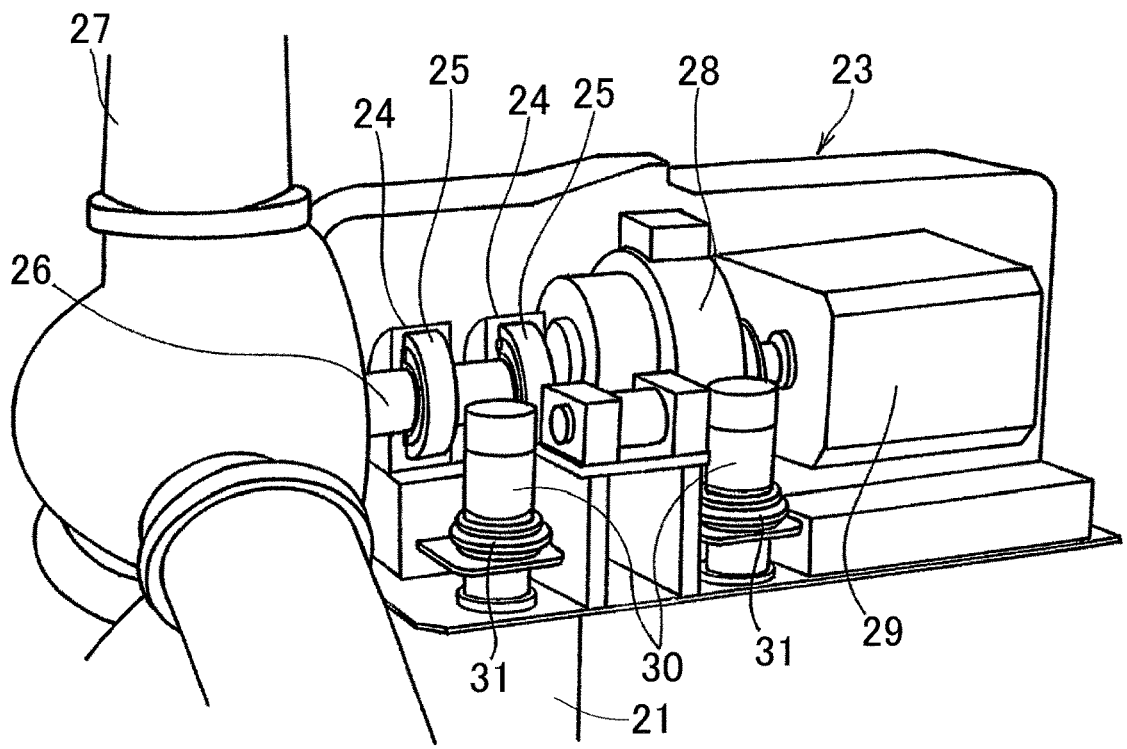
FIG. 11 is a perspective view shown by sectioning a part of a main shaft support device of a wind turbine generator as an example.
Figure 12:
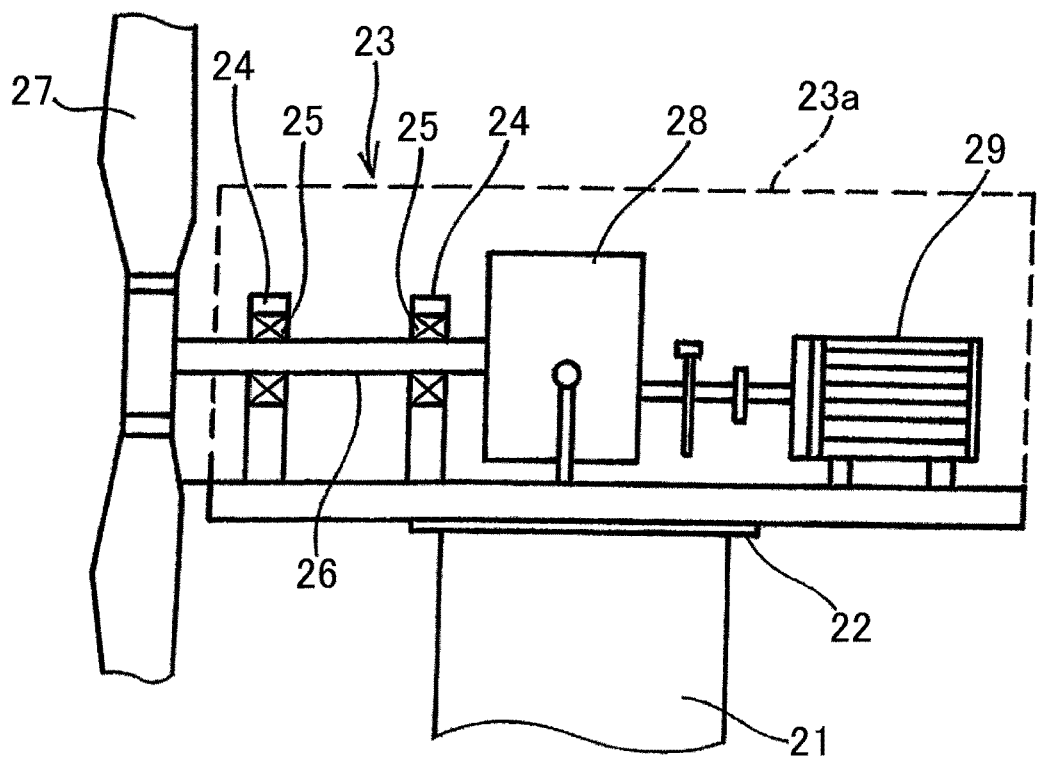
FIG. 12 is a cutaway side view of the main shaft support device.

FIG. 11 and FIG. 12 illustrate an example of a main shaft support device of a wind turbine generator. A casing 23a of a nacelle 23 is horizontally turnably disposed on a support 21 via a revolving seat bearing 22 (FIG. 12). A main shaft 26 is rotatably fitted within the casing 23a of the nacelle 23 via main shaft support bearings 25 disposed in bearing housings 24, and blades 27 that serve as rotor blades are attached to a portion of the main shaft 26 projected outside of the casing 23a. As the main shaft support bearings 25, double-row self-aligning roller bearings according to either embodiment are used.

The other end of the main shaft 26 is connected to a speed increasing gear 28, and an output shaft of the speed increasing gear 28 is coupled to a rotor shaft of a power generator 29. The nacelle 23 is revolved to any angle by revolving motors 30 via reduction gears 31. The illustrated example has two main shaft support bearings 25 arranged in series but may have a single main shaft support bearing.

Another embodiment will be described.

In the following description, the same reference numerals are used to denote parts that correspond to those previously described in the respective embodiments, and overlapping description is omitted. Where only a part of a configuration is described, the rest of the configuration is to be construed as being the same as the previously described embodiments unless otherwise indicated. The same configurations provide the same effects. It is possible not only to combine the parts that have been particularly described in the respective embodiments but also to partly combine the embodiments unless there is any hindrance to such a combination.

A double-row self-aligning roller bearing according to another embodiment will be described with reference to FIG. 13 to FIG. 17.

Figure 13:
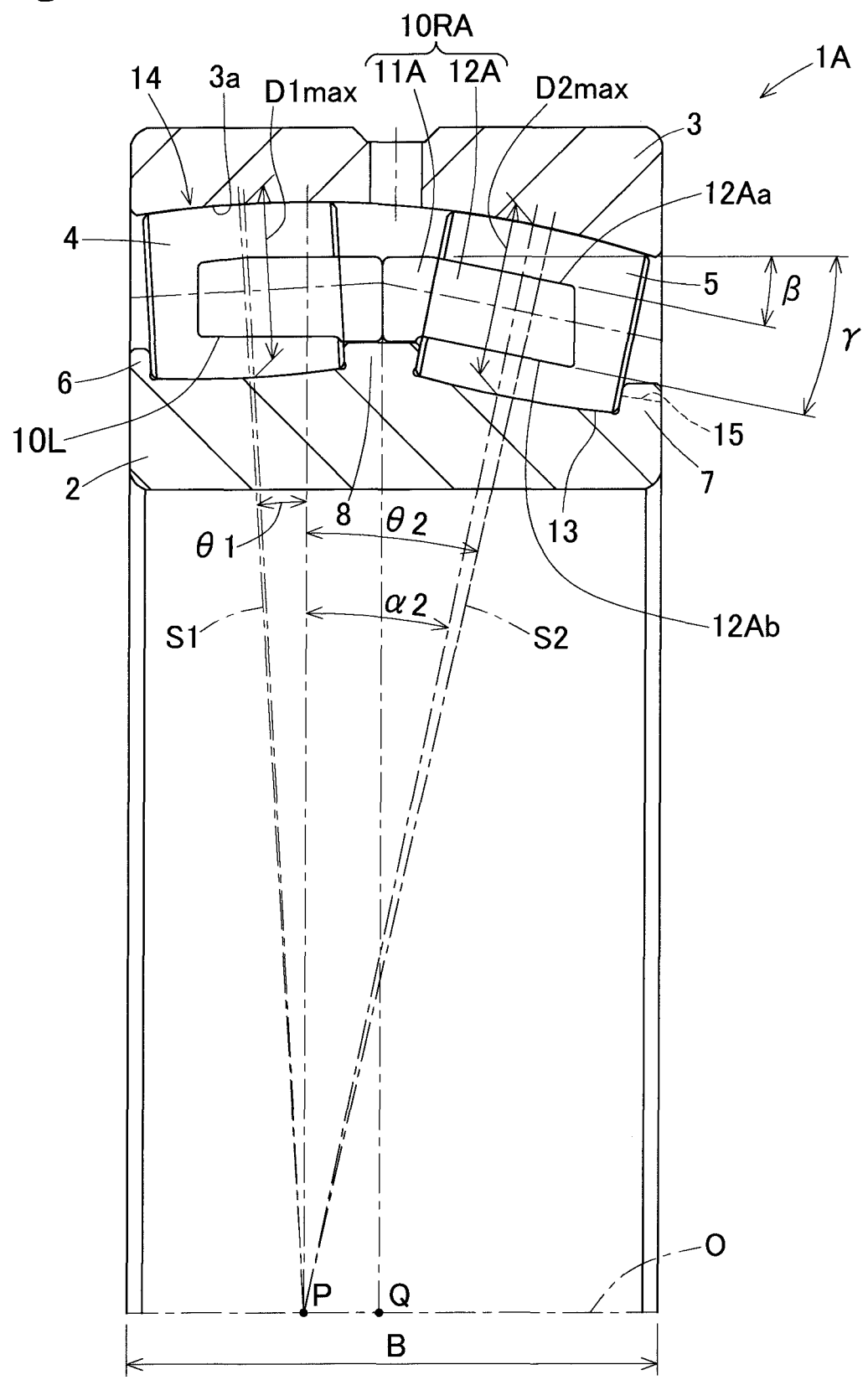
FIG. 13 is a section view of a double-row self-aligning roller bearing according to another embodiment of the present invention.

As shown in FIG. 13, the double-row self-aligning roller bearing 1A includes (1) a retainer 10RA with an inclination angle, (2) a crowning 13, (3) a DLC coating 14, and (4) an insertion groove 15.

<(1) Regarding the Retainer with an Inclination Angle or the Like>

One retainer 10RA for the right row shown in FIG. 13 is a retainer configured to retain rollers 5 having a longer axial length. The pillar portions 12A of the retainer 10RA have an outer diameter surface 12Aa inclined by an inclination angle β inwardly in the radial direction from a proximal end side to a distal end side. The inclination angle β is an angle relative to a bearing center axis O. The inclination angle β of the outer diameter surface 12Aa of the retainer 10RA is set to be within a range that is greater than zero and equal to or less than a maximum diameter angle α2 of the rollers 5 in the right row (0<β≤α2). The maximum diameter angle α2 is an inclination angle of the position of the maximum diameter D2$_{max}$ of the rollers 5 in the right row relative to a plane perpendicular to the bearing center axis O.

In this example, an inner diameter surface 12Ab of the pillar portions 12A in the retainer 10RA for the right row extends from the proximal end side of the inner diameter surface 12Ab of the pillar portions 12A to the distal end side of the inner diameter surface in the axial direction and has an inclination angle γ such that it is inclined inwardly in the radial direction from the proximal end side to the distal end side in the axial direction. The inclination angle γ is also an angle relative to the bearing center axis O, and the inclination angle γ is set to be equal to the inclination angle β (γ=β). It should be noted that the relation between the inclination angle β and the inclination angle γ is not limited to this relation (γ=β). The other retainer 10L for the left row is configured such that the outer diameter surface and the inner diameter surface of the pillar portions 12 do not have an inclination angle, that is, are in parallel with the bearing center axis O.

<(2) Regarding the Crowning 13>

Figure 14:
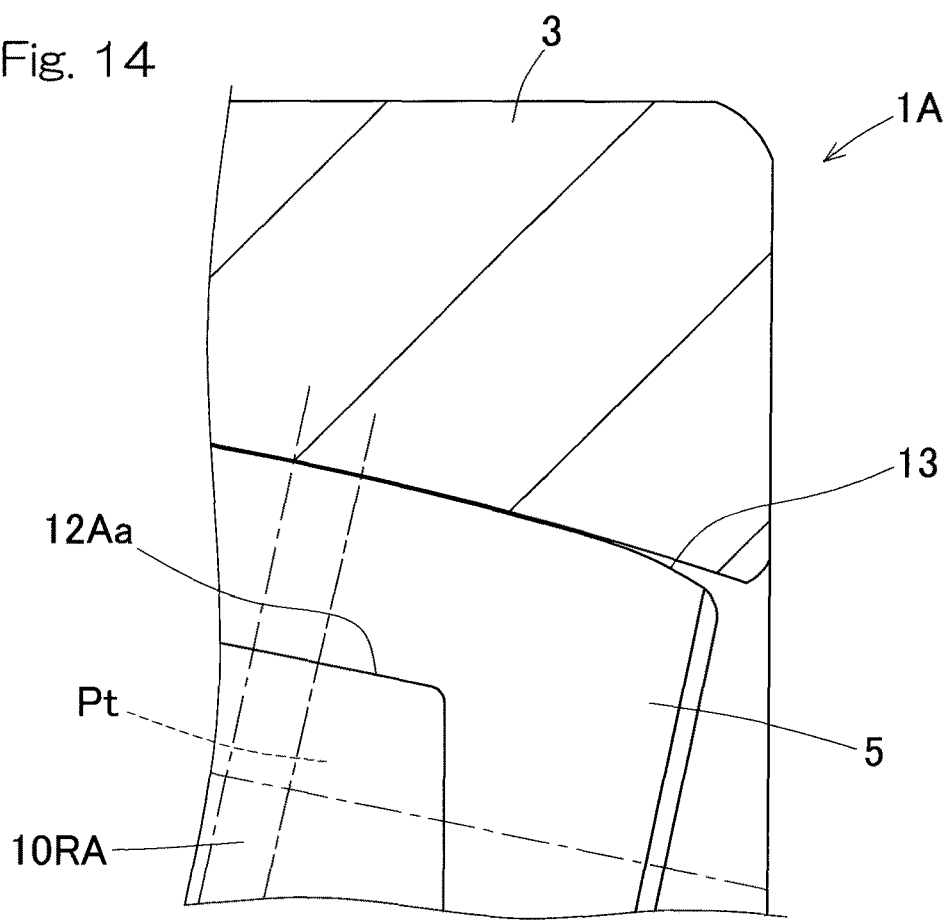
FIG. 14 is an enlarged section view illustrating a part of the double-row self-aligning roller bearing.

FIG. 14 is an enlarged section view of a part of FIG. 13. As shown in FIG. 13 and FIG. 14, each of the rollers 4, 5 in the left and right rows has a roller rolling surface formed with a crowning 13 on each end portion. The roller rolling surface of this example is formed in a logarithmic crowning shape represented by a logarithmic curve. However, the crowning 13 is not limited to the logarithmic crowning shape, and, for example, the roller rolling surface may be formed in a combined R crowning shape. The combined R crowning shape with a larger drop quantity can be formed by making an R dimension of the crowning portion smaller than a reference R of the roller rolling surface.

<(3) Regarding the DLC Coating 14>

Figure 15:
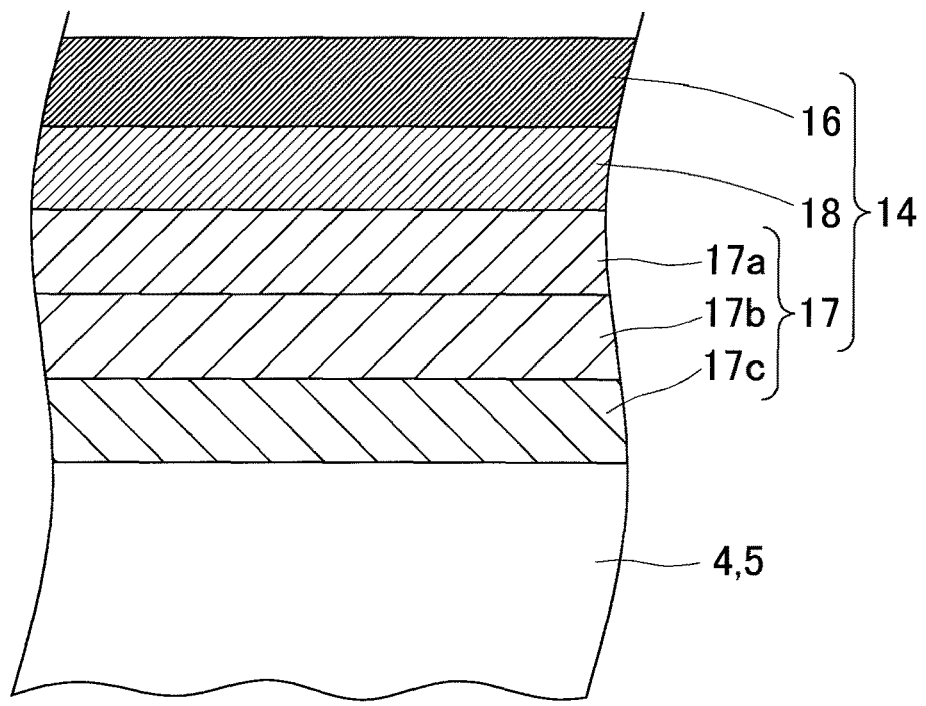
FIG. 15 is an enlarged section view illustrating a DLC coating and the like of a roller of the double-row self-aligning roller bearing.

As shown in FIG. 15, each of the rollers 4, 5 has a roller rolling surface coated with a DLC coating 14. The DLC coating 14 of this example has a multilayered structure that is highly adhesive to the rollers 4, 5 that are a base material. The DLC coating 14 includes a surface layer 16, an intermediate layer 17 and a stress relaxing layer 18. The surface layer 16 is a film mainly composed of DLC, in which only graphite of a solid target is used as a carbon supply source to reduce an amount of hydrogen mixed thereto. The intermediate layer 17 is a layer mainly composed of at least Cr or W and formed between the surface layer 16 and the base material. The stress relaxing layer 18 is formed between the intermediate layer 17 and the surface layer 16.

The intermediate layer 17 has a structure including a plurality of sublayers having different compositions, and FIG. 15 shows a three-layered structure having sublayers 17a-17c as an example. For example, a sublayer 17c mainly composed of Cr is formed on the surface of the base material, then a sublayer 17b mainly composed of W is formed thereon, and further a sublayer 17a mainly composed of W and C is formed thereon. FIG. 15 shows a three-layered structure as an example, but the intermediate layer 17 may include a greater or smaller number of sublayers as necessary.

The sublayer 17a that adjoins the stress relaxing layer 18 can enhance adhesiveness between the intermediate layer 17 and the stress relaxing layer 18 by being mainly composed of carbon and a metal that mainly composes the sublayer 17b which the sublayer 17a adjoins on the other side. For example, where the sublayer 17a is mainly composed of W and C, its adhesiveness can be further enhanced by decreasing a W content while increasing a C content (composition gradient) from the side of the intermediate sublayer 17b that is mainly composed of W toward the side of the stress relaxing layer 18 that is mainly composed of C.

The stress relaxing layer 18 is a graded layer that is mainly composed of C and has hardness continuously or stepwisely increasing from the side of the intermediate layer 17 toward the side of the surface layer 16. Particularly, the stress relaxing layer 18 is a DLC graded layer that can be formed by using a graphite target and increasing a bias voltage to the base material continuously or stepwisely in the UBMS method. The reason why the hardness increases continuously or stepwisely is that a composition ratio of the graphite structure ($SP^2$) and the diamond structure ($SP^3$) in the DLC structure shifts toward the latter due to the increasing bias voltage.

The surface layer 16 is a film that is extendedly formed after the stress relaxing layer 18 and is mainly composed of DLC and, in particular, is a DLC film that has a reduced hydrogen content in the structure. The reduction of the hydrogen content enhances wear resistance. In order to form such a DLC film, for example, the UBMS method is used to prevent mixing of hydrogen and compounds containing hydrogen into ingredients and sputtering gas used for sputtering processing.

For the film formation method for the stress relaxing layer 18 and the surface layer 16, the case where the UBMS method is employed is described as an example, but any known film formation method may be employed as long as it can change hardness continuously or stepwisely. It is preferable that the total thickness of the multi-layered film including the intermediate layer 17, the stress relaxing layer 18 and the surface layer 16 is from 0.5 μm to 3.0 μm. A total film thickness outside this range is not preferable because the film becomes inferior in wear resistance and mechanical strength if the total film thickness is less than 0.5 μm, while the film tends to be easily peeled off if the total film thickness is greater than 3.0 μm. It should be noted that although the DLC coating 14 is provided only on the outer peripheral surfaces of the respective rollers 4, 5 in this example, the DLC coating 14 may further be provided on end faces on opposite sides of the respective rollers 4, 5. In particular, if the DLC coating 14 is provided on the end faces of the respective rollers 4, 5 which are guided by intermediate flange 8 (FIG. 13), the end faces of the respective rollers 4, 5 become less prone to wear, which can enhance wear resistance of the rollers 4, 5.

<(4) Regarding the Insertion Groove>

Figure 16:
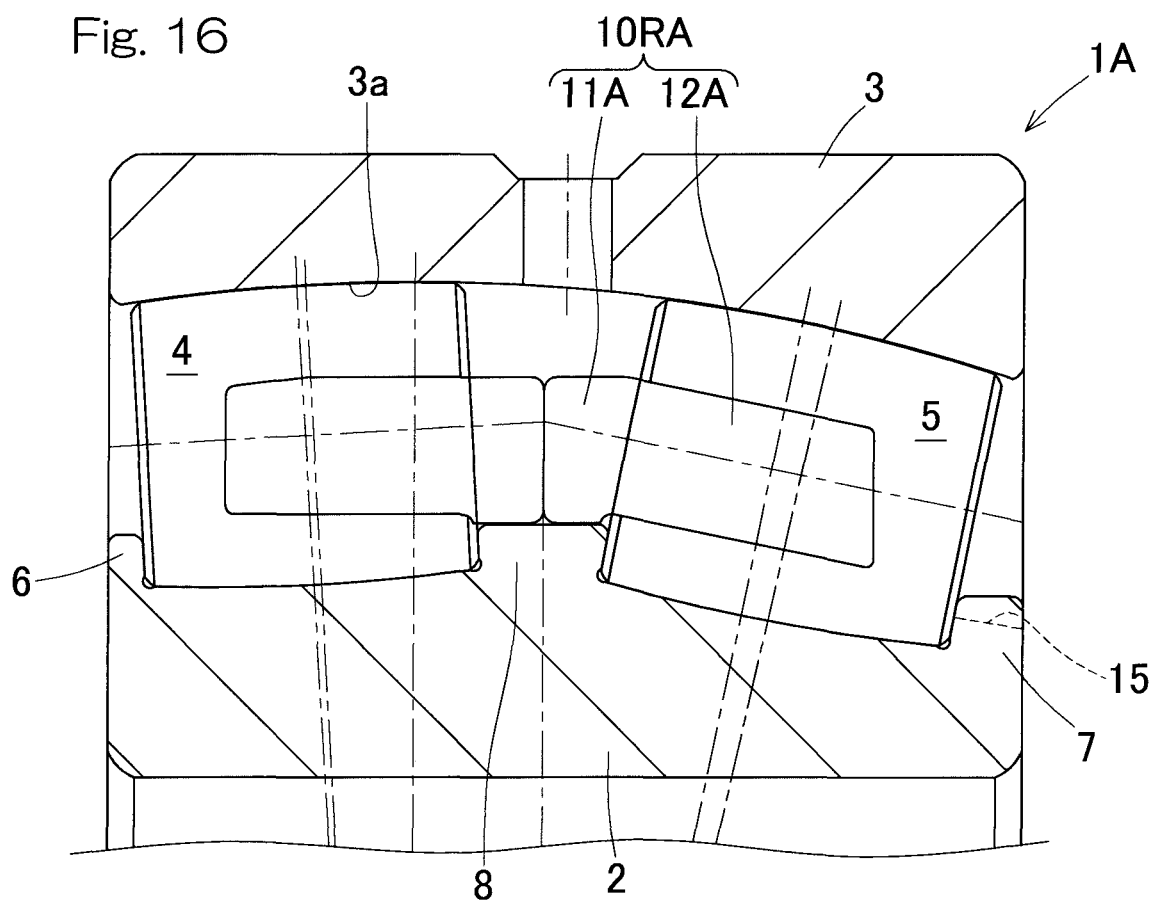
FIG. 16 is an enlarged section view illustrating an insertion groove etc. of the inner ring of the double-row self-aligning roller bearing.
Figure 17:
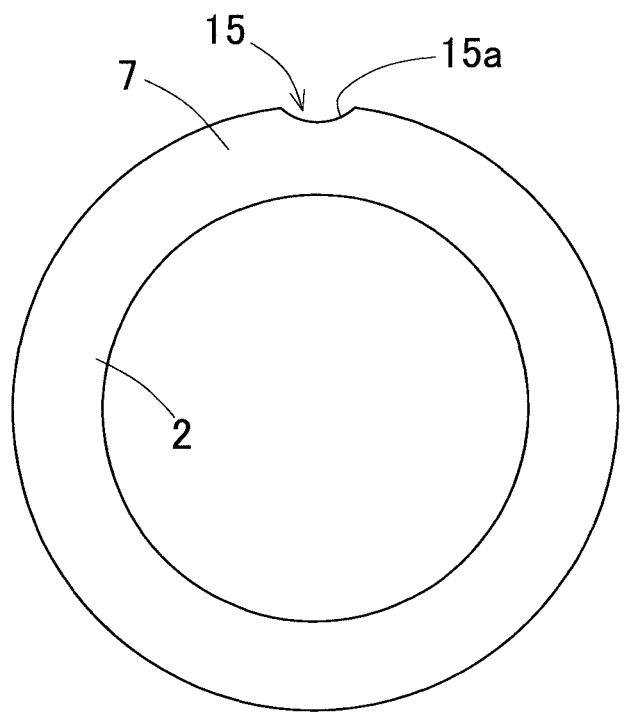
FIG. 17 is an end face view of the insertion groove etc. of the inner ring when view as seen from the axial direction.

As shown in FIG. 16, the inner ring 2 includes an insertion groove 15 configured to insert therethrough the longer rollers 5 into the bearing on the small flange 7 of the small flanges 6, 7 which faces the axially outer end faces of the longer rollers 5. As shown in FIG. 17, the small flange 7 of the inner ring 2 is provided with an insertion groove 15 of a circular arc shape at a location in the circumferential direction. A radius of curvature of a circular arc 15a of the insertion groove 15 is suitably set according to the maximum diameter of the rollers 5 (FIG. 16) to be inserted.

Other features are similar to those of the previously described embodiments. According to a double-row self-aligning roller bearing 1A according to another embodiment shown in FIG. 13, since each of the rollers 4, 5 has the roller rolling surface coated with a DLC coating 14, wear resistance can be enhanced. Thus, less wear occurs on the roller rolling surface and on the raceway surfaces 3a of the inner ring 2 and the outer ring 3, compared with rollers without the DLC coating. Further, as the roller rolling surface is formed with a crowning 13 on each end portion, edge stress can be relaxed.

As the pillar portions 12A of one retainer 10RA of the retainers which is configured to retain the longer rollers 5 have the outer diameter surface 12Aa inclined by the inclination angle β inwardly in the radial direction from the proximal end side to the distal end side, pocket Pt surfaces (FIG. 14) of the retainer 10RA can hold the rollers 5 at maximum diameter positions thereof. In other words, since the retainer 10RA has the inclination angle 1 as described above, the pocket Pt surfaces of the retainer 10RA are maintained near a pitch circle diameter of the rollers 5, and the pocket Pt surfaces of the retainer 10RA can smoothly hold the rollers 5 at the maximum diameter positions thereof during bearing operation. Thus, it is possible to secure attitude stability of the longer rollers 5 and to easily incorporate the longer rollers 5 into the bearing. As the inner ring 2 includes the insertion groove 15 configured to insert therethrough the longer rollers 5 into the bearing on the small flange 7 of the respective small flanges 6, 7 which faces the axially outer end faces of the longer rollers 5, incorporation of the longer rollers 5 can be further improved.

The embodiment as shown in FIG. 1 may include at least one of (1) a retainer 10RA with an inclination angle, (2) a crowning 13, (3) a DLC coating 14, and (4) an insertion groove 15. In such a case, the bearing can also provide the effect of the configuration(s) included thereto, in addition to the effect of the embodiment shown in FIG. 1.

Although the present invention has been fully described in connection with the embodiments thereof, the embodiments disclosed herein are merely examples in all respects, and are not to be taken as limiting the scope of the present invention in any way whatsoever. The scope of the present invention is to be determined by the appended claims, not by the above description, and is intended to include any change made within the scope of claims or equivalent thereto.

What is claimed is:

1. A double-row self-aligning roller bearing, comprising:
an inner ring;
an outer ring having a spherical raceway surface;
rollers in two rows arranged in a bearing width direction, the rollers being interposed between the inner ring and the outer ring, the rollers in the two rows each having an outer peripheral surface whose cross-sectional shape corresponds to the raceway surface of the outer ring; and
an intermediate flange, provided between the two rows of the rollers on an outer peripheral surface of the inner ring, configured to guide the rollers in the two rows,
wherein
each of the rollers in the two rows is an asymmetrical roller having a maximum diameter at a position displaced from a center of a roller length of the roller toward a center of the bearing along a bearing axial direction,
each roller in one row of the two rows has a length different from that of each roller in the other row of the two rows,
the length of the longer rollers is equal to or greater than 36% of a bearing width,
a ratio of a contact angle of the shorter rollers relative to a contact angle of the longer rollers is within a range of 1:4 to 1:2,
the contact angle of the shorter rollers has a range of 3° to 5°, and the contact angle of the longer rollers has a range of 11° to 14°, and
lines of action which define the contact angles of the two rows intersect at a position in the bearing width direction that overlaps a range in the bearing width direction of the shorter rollers.

2. The double-row self-aligning roller bearing as claimed in claim 1, further comprising:
retainers configured to retain the rollers of the respective rows, wherein each retainer includes an annular portion configured to guide axially inner end faces of the rollers of each row; and
a plurality of pillar portions extending in an axial direction from the annular portion and provided at predetermined intervals along a circumferential direction, the pillar portions defining therebetween pockets configured to retain the rollers, and
wherein the pillar portions of one of the retainers which is configured to retain the longer rollers have an outer diameter surface inclined by an inclination angle inwardly in a radial direction from a proximal end side to a distal end side.

3. The double-row self-aligning roller bearing as claimed in claim 1, wherein each of the rollers has a rolling surface coated with a DLC coating and formed with a crowning on each end portion of the roller rolling surface.

4. The double-row self-aligning roller bearing as claimed in claim 1, wherein
the inner ring includes flanges provided on opposite ends of the outer peripheral surface and facing axially outer end faces of the rollers of the respective rows, and
one of the flanges which faces the axially outer end faces of the longer rollers includes an insertion groove configured to insert therethrough the longer rollers into the bearing.

* * * * *